United States Patent
Chen et al.

(10) Patent No.: US 11,981,231 B2
(45) Date of Patent: May 14, 2024

(54) DUAL TRACTION BATTERY POWER SYSTEM WITH CHARGE BALANCING CIRCUITRY

(71) Applicant: Ford Global Technologies, LLC, Dearborn, MI (US)

(72) Inventors: Lihua Chen, Farmington Hills, MI (US); Boris Curuvija, West Bloomfield, MI (US); Baoming Ge, Okemos, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/890,579

(22) Filed: Aug. 18, 2022

(65) Prior Publication Data

US 2024/0059187 A1    Feb. 22, 2024

(51) Int. Cl.
*B60L 58/22* (2019.01)
*B60L 58/12* (2019.01)
*H02J 7/00* (2006.01)
*H02P 5/74* (2006.01)

(52) U.S. Cl.
CPC .............. *B60L 58/22* (2019.02); *B60L 58/12* (2019.02); *H02J 7/0019* (2013.01); *H02P 5/74* (2013.01); *H02J 2207/20* (2020.01)

(58) Field of Classification Search
CPC ........ B60L 58/12; B60L 58/22; H02J 7/0019; H02J 2207/20; H02P 5/74
USPC ....................................................... 307/10.1
See application file for complete search history.

(56) References Cited

U.S. PATENT DOCUMENTS

| 6,737,756 | B1 | 5/2004 | Gale et al. |
| 6,930,404 | B1 | 8/2005 | Gale et al. |
| 7,719,138 | B2 | 5/2010 | Gallegos-Lopez et al. |
| 2021/0013878 | A1* | 1/2021 | Song .................. H03K 17/0828 |

FOREIGN PATENT DOCUMENTS

DE    102010043397 A1    6/2011

* cited by examiner

*Primary Examiner* — Hal Kaplan
(74) *Attorney, Agent, or Firm* — David B. Kelley; Brooks Kushman P.C.

(57) ABSTRACT

A power system includes an inverter, a pair of traction batteries electrically in series, and collectively in parallel with the inverter, a plurality of switches electrically in series, and collectively electrically in parallel with the traction batteries and inverter such that the switches are connected between the traction batteries and inverter, and one or more controllers programmed to operate the switches during charge of one of the traction batteries or operation of the inverter to balance states of charge of the traction batteries.

20 Claims, 4 Drawing Sheets

DUAL TRACTION BATTERY POWER SYSTEM WITH CHARGE BALANCING CIRCUITRY

TECHNICAL FIELD

This disclosure relates to vehicle power systems and the control thereof.

BACKGROUND

Certain vehicles may be powered by electric machines that convert electrical energy to mechanical energy.

SUMMARY

A vehicle includes a pair of electric machines, a pair of inverters electrically in series with each of the inverters providing power to one of the electric machines, a pair of traction batteries electrically in series with each of the traction batteries electrically in parallel with one of the inverters, and a plurality of switches electrically in series, and collectively electrically in parallel with the traction batteries and inverters such that the switches are connected between the traction batteries and inverters.

One or more controllers may operate the switches during charge of one of the traction batteries to balance states of charge of the traction batteries. One or more controllers may operate the switches during operation of one or both of the electric machines to balance a state of charge of the traction batteries. A capacitor may be electrically in parallel with a collective pair of the switches. A number of the switches may be four. An inductor may have a terminal electrically connected between an adjacent pair of the switches and a terminal electrically connected between the traction batteries. A number of the switches may be two. One of the traction batteries may receive charge from a charger. The traction batteries may receive charge from a charger.

A power system includes an inverter, a pair of traction batteries electrically in series, and collectively in parallel with the inverter, a plurality of switches electrically in series, and collectively electrically in parallel with the traction batteries and inverter such that the switches are connected between the traction batteries and inverter, and one or more controllers that operate the switches during charge of one of the traction batteries or operation of the inverter to balance states of charge of the traction batteries.

A capacitor may be electrically in parallel with a collective pair of the switches. A number of the switches may be four. One of the traction batteries may receive charge from a charger. The traction batteries may receive charge from a charger.

A power system includes a pair of inverters electrically in series, a pair of traction batteries electrically in series with each of the traction batteries electrically in parallel with one of the inverters, a plurality of switches electrically in series, and collectively electrically in parallel with the traction batteries and inverters such that the switches are connected between the traction batteries and inverters, and one or more controllers that operate the switches during charge of one of the traction batteries or operation of the inverters to balance states of charge of the traction batteries.

A capacitor electrically may be in parallel with a collective pair of the switches. A number of the switches may be four. An inductor may have a terminal electrically connected between an adjacent pair of the switches and a terminal electrically connected between the traction batteries. A number of the switches may be two. The traction batteries may be 400V traction batteries.

BRIEF DESCRIPTION OF THE DRAWINGS

In the following detailed description, reference is made to the accompanying figures, which form a part hereof, and in which are shown by way of illustration specific embodiments. Other embodiments, of course, are also contemplated and/or described.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
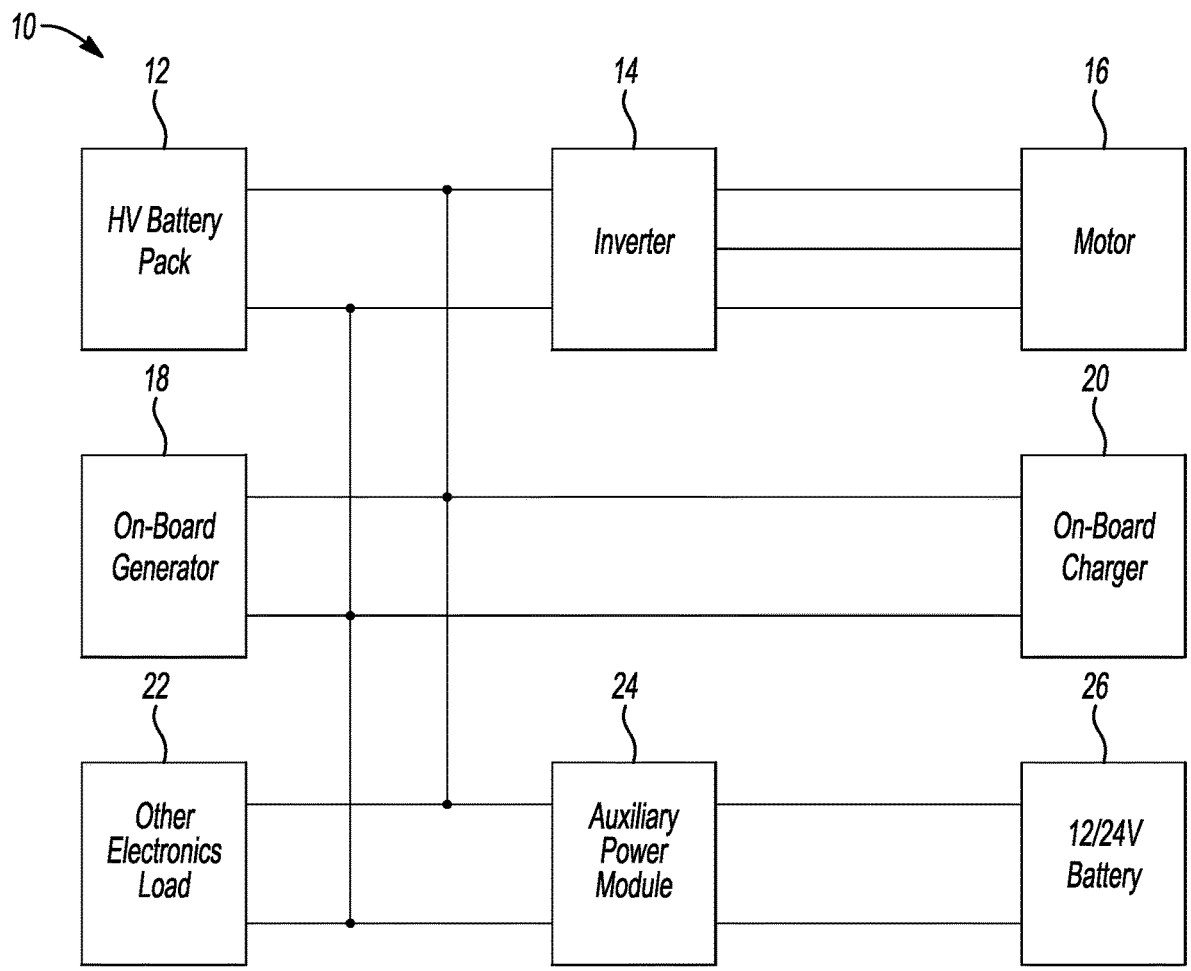
FIG. 1 is a block diagram of a typical high voltage power system of an electric vehicle.

Referring to FIG. 1, a typical high voltage power system 10 for a battery-based electric vehicle (BEV) includes a high voltage (HV) battery pack 12, an inverter 14, a motor 16, an on-board generator (OBG) 18, an on-board charger (OBC) 20, other electronic loads 22, an auxiliary power module (APM) 24, and an auxiliary battery 26. The HV battery pack 12 provides energy to drive the vehicle through the inverter 14 and traction motor 16. The OBG 18 converts direct current (DC) electricity into alternating current (AC) power for customers. The OBC 20 performs HV battery charging. The APM 24 provides charging for the auxiliary battery 26. The other electronic loads 22, such as electric air conditioning, share a common HV DC bus having a voltage typically around 400V DC.

Increasing DC bus voltage is a trend to enhance power capability of traction inverters and motors. Recently, 800V DC bus-based electric drive systems are a topic of interest. When a high DC bus voltage is designed, the existing OBC 20, OBG 18, APM 24, and other electronic loads 22 may no longer be applicable because they are rated for a lower voltage (e.g., 400V). They should be re-designed to fit a higher DC bus voltage, which may result in more expense and development time.

In addition, for a 400V system, the converters such as the OBC 20 and APM 24 use switches (e.g., MOSFETs) with a voltage rating that is less than 650V to increase switching frequency, reduce converter size, and optimize performance. If the DC bus voltage is 800V however, 1200V power devices should be selected. It may be challenging to select MOSFETs of voltage rating over 650V because of limited choice, higher expense, and lower performance, such as high voltage drops, high reverse recovery losses, high leakage currents, and low switching speeds.

Here, traction battery systems that achieve, for example, 800V DC fast charging with existing 400V electric drive systems are proposed. Thus, existing 400V inverters, OBCs, OBGs, APMs, and other electronic loads can be directly applied to an 800V traction battery, which enables 800V DC fast chargers for the traction battery. The proposed systems can also be applied to 800V electric drive systems with 400V inverters, OBCs, OBGs, APMs, and other electronic loads.

In certain embodiments, two or more 400V battery packs are in series to form an 800V traction battery that directly interfaces with an 800V DC fast charger. The 400V batteries provide power to respective inverters. One of the 400V batteries interfaces with 400V AC/DC charger and 400V auxiliary circuits, such as an OBC, OBG, APM, and other electronic loads. Therefore, existing 400V inverters, OBCs, OBGs, APMs, and other electronic loads can be directly applied to an 800V traction battery, which enables use of 800V DC fast chargers-providing opportunity to reduce charging times.

The two 400V battery packs, in certain examples, are actively managed by four switches and one capacitor, or two switches and one inductor. Power transfer will take place between the two battery packs if their battery voltages or states of charge are different. For example, if the voltage of one battery is 300V and the voltage of the other battery is 310V, there is a power transfer from the one battery to the other, which is controlled by selective activation of the four switches and capacitor, or the selective activation of the two switches and the inductor, depending on the configuration.

Figure 2:
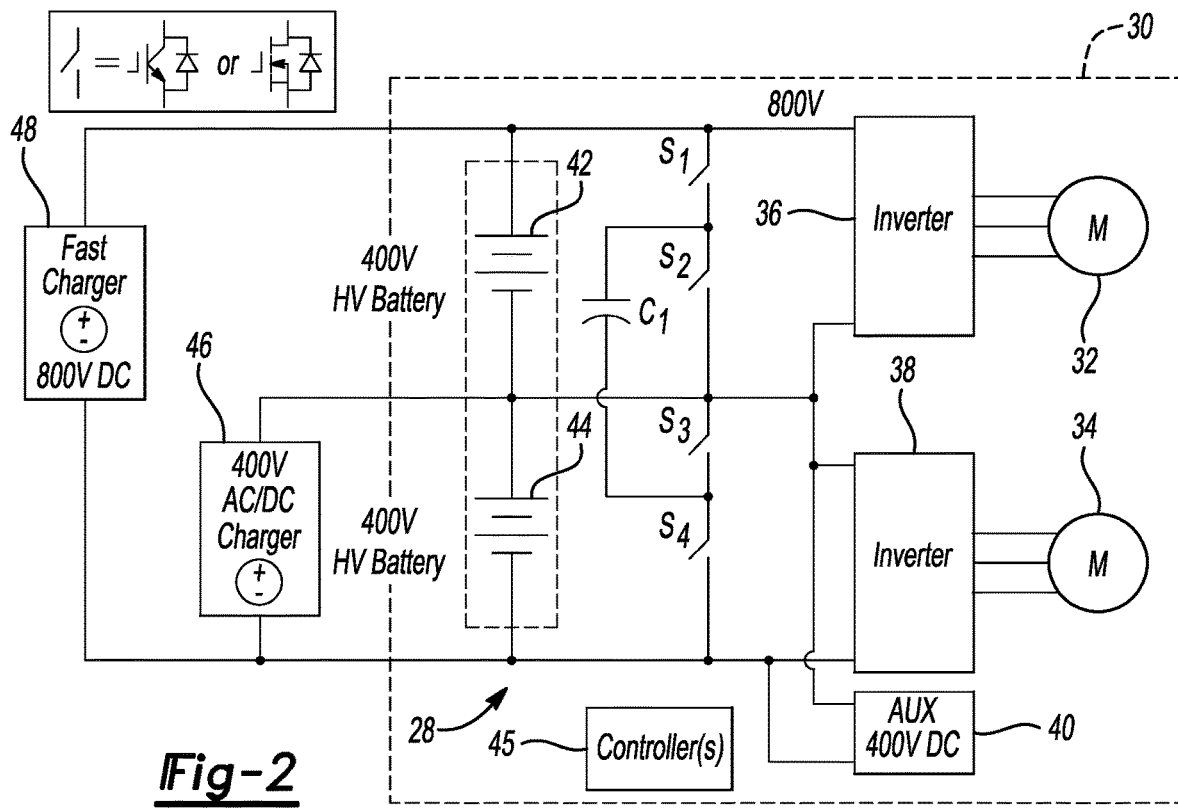
FIGS. 2 and 3 are block diagrams of portions of example automotive vehicles and charger equipment.

Referring to FIG. 2, a power system 28 for a vehicle 30 includes a pair of electric machines 32, 34, a pair of inverters 36, 38, 400V auxiliary circuits 40, such as an OBC, OBG, APM and other electronic loads, four switches S1, S2, S3, S4, a capacitor C1, a pair of 400V batteries, 42, 44, and a controller 45. The electric machine 32 is electrically connected with the inverter 36. The electric machine 34 is electrically connected with the inverter 38. The inverters 36, 38 are electrically in series. The switches S1, S2, S3, S4 are electrically in series, and are electrically in parallel with the inverters 36, 38. The switches S1, S2 are also electrically in parallel with the inverter 36, and the switches S3, S4 are electrically in parallel with the inverter 38 and 400V auxiliary circuits 40. The capacitor C1 is electrically in parallel with the switches S2, S3, which are adjacent to one another. The 400V batteries 42, 44 are electrically in series. The 400V battery 42 is also electrically in parallel with the switches S1, S2 and inverter 36, and the 400V battery 44 is electrically in parallel with the switches S3, S4, inverter 38, and 400V auxiliary circuits 40. The controller 45 is in communicative control with the components of the vehicle 30 and, among other things, can command selective activation of the switches S1, S2, S3, S4 as discussed in more detail below.

The 400V battery 44 can thus be electrically connected across a 400V AC/DC charger 46 to directly charge the 400V battery 44 and indirectly charge the 400V battery 42 via selective activation of the switches S1, S2, S3, S4 as discussed in more detail below. The 400V batteries 42, 44 can thus be electrically connected across an 800V DC fast charger 48 to directly charge both of the 400V batteries 42, 44.

Figure 3:
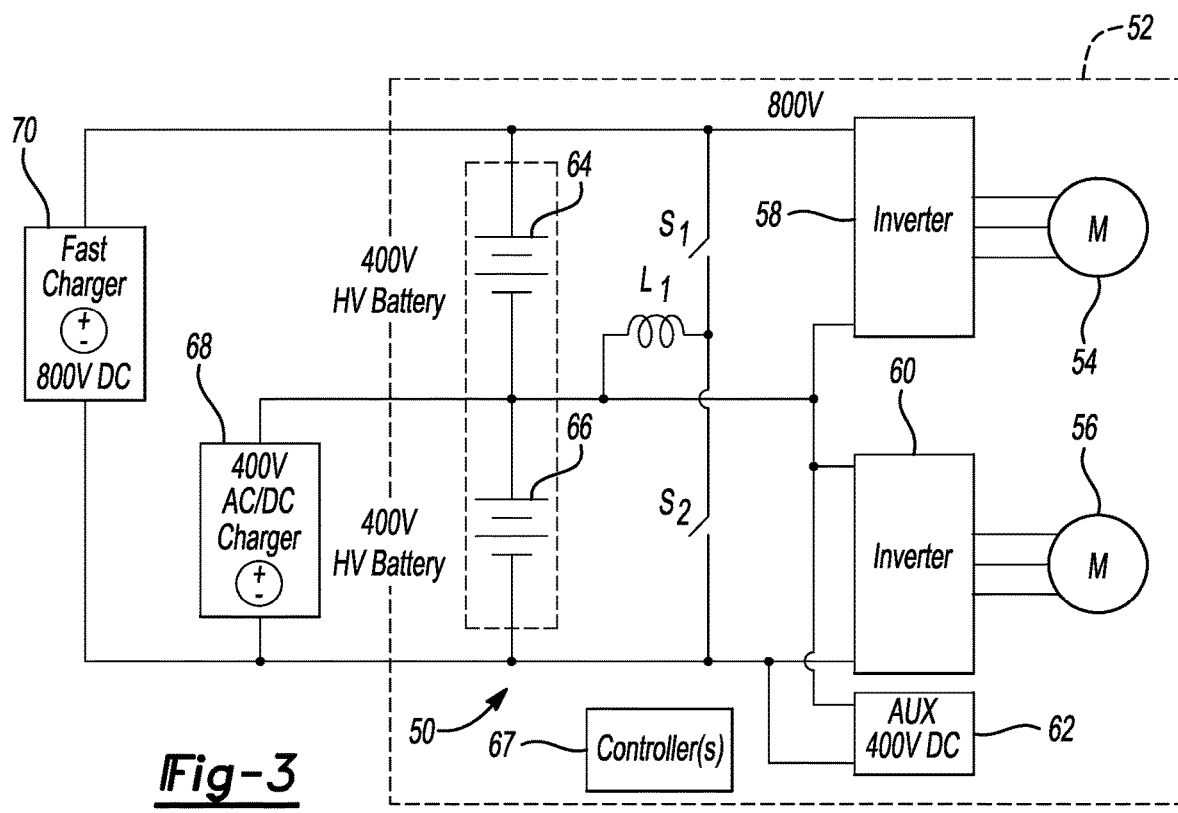

Referring to FIG. 3, a power system 50 for a vehicle 52 includes a pair of electric machines 54, 56, a pair of inverters 58, 60, 400V auxiliary circuits 62, such as an OBC, OBG, APM and other electronic loads, two switches S1, S2, an inductor L1, a pair of 400V batteries 64, 66, and a controller 67. The electric machine 54 is electrically connected with the inverter 58. The electric machine 56 is electrically connected with the inverter 60. The inverters 58, 60 are electrically in series. The switches S1, S2 are electrically in series, and are electrically in parallel with the inverters 58, 60. The switch S1 is also electrically in parallel with the inverter 58, and the switch S2 is electrically in parallel with the inverter 60 and 400V auxiliary circuits 62. A terminal of the inductor L1 is electrically connected between the switches S1, S2. The 400V batteries 64, 66 are electrically in series. Another terminal of the inductor L1 is electrically connected between the 400V batteries 64, 66. The 400V battery 64 is also electrically in parallel with the switch S1 and inductor L1 collectively, and inverter 58, and the 400V battery 66 is electrically in parallel with the switch S2, inverter 60, and 400V auxiliary circuits 62. The controller 67 is in communicative control with the components of the vehicle 52 and, among other things, can command selective activation of the switches S1, S2 as discussed in more detail below.

The 400V battery 64 can thus be electrically connected across a 400V AC/DC charger 68 to directly charge the 400V battery 64 and indirectly charge the 400V battery 66. The 400V batteries 64, 66 can thus be electrically connected across an 800V DC fast charger 70 to directly charge both of the 400V batteries 64, 66.

Figure 4:
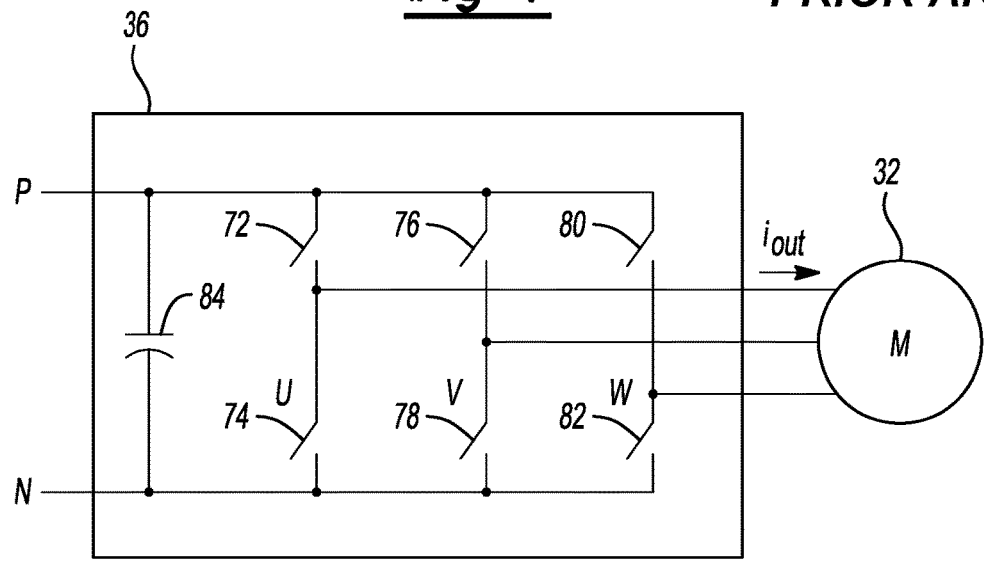
FIG. 4 is a schematic diagram of an example inverter.

Referring to FIG. 4, the inverter 36 includes a plurality of switches 72, 74, 76, 78, 80, 82, 84, and a capacitor 84. The switches 72, 74 are electrically in series and form a U phase leg. The switches 76, 78 are electrically in series and form a V phase leg. The switches 80, 82 are electrically in series and form a W phase leg. The phase legs U, V, W are electrically in parallel, and each is electrically connected with the electric machine 32. The capacitor 84 is electrically in parallel with the phase legs U, V, W such that the phase legs U, V, W, are between the electric machine 32 and capacitor 84. The inverters 38, 58, 60, etc., may be similarly constructed. Other topologies, however, may also be used.

The switches herein may be, for example, transistors (e.g., field effect transistors such as metal-oxide-semiconductor field-effect transistors, etc.) Other switching devices, however, can be used as design requirements dictate.

Figure 5A:
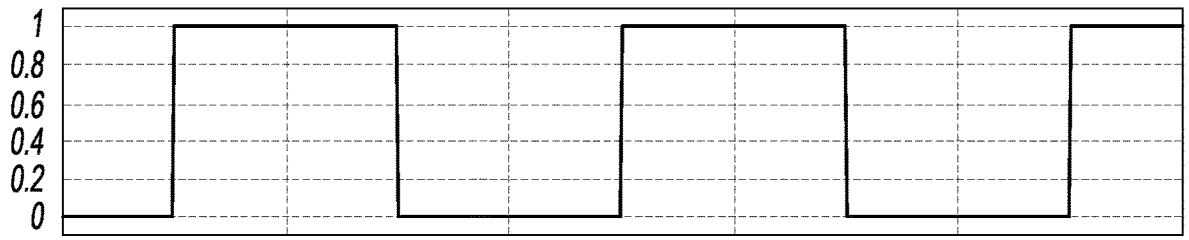
FIGS. 5A and 5B are traces of duty cycles for the switches of FIG. 2.
Figure 5B:
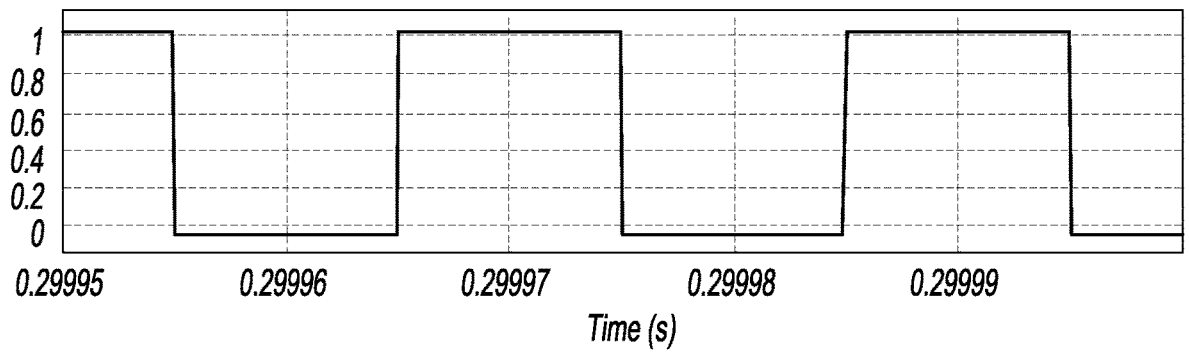

Referring to FIGS. 5A and 5B and at the command of the controller 45, the switches S1, S3 may be operated with a first duty cycle, and the switches S2, S4 may be operated with a complementary duty cycle to balance the voltage/state of charge of the 400V batteries 42, 44. This switch cycling may take place whenever the 400V AC/DC charger 46 is being used to charge the 400V battery 44, or when either or both of the 400V batteries 42, 44 are being used during operation of the vehicle 30. Because the 400V batteries 42, 44 are electrically in series, they should remain balanced when being charged via the 800V DC fast charger 48.

Figure 6A:
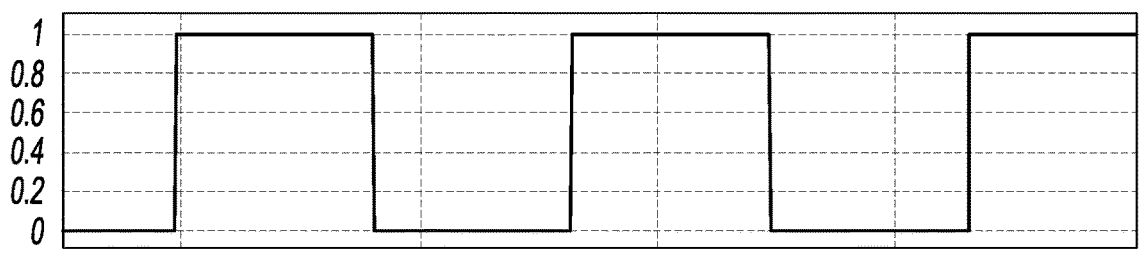
FIGS. 6A and 6B are traces of duty cycles for the switches of FIG. 3.
Figure 6B:
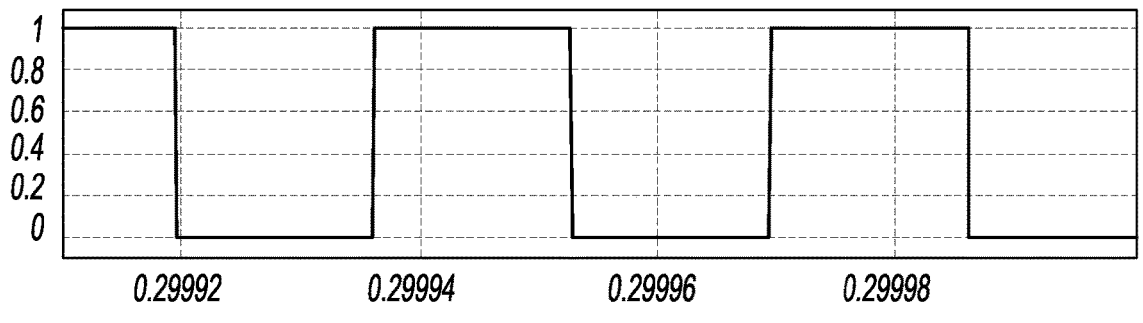

Referring to FIGS. 6A and 6B and at the command of the controller 67, the switch S1 may be operated with a first duty cycle, and the switch S2 may be operated with a complementary duty cycle to balance the voltage/state of charge of the 400V batteries 64, 66. As mentioned above, this switch cycling may take place whenever the 400V AC/DC charger 68 is being used to charge the 400V battery 66, or when either or both of the 400V batteries 64, 66 are being used during operation of the vehicle 52.

Figure 7:
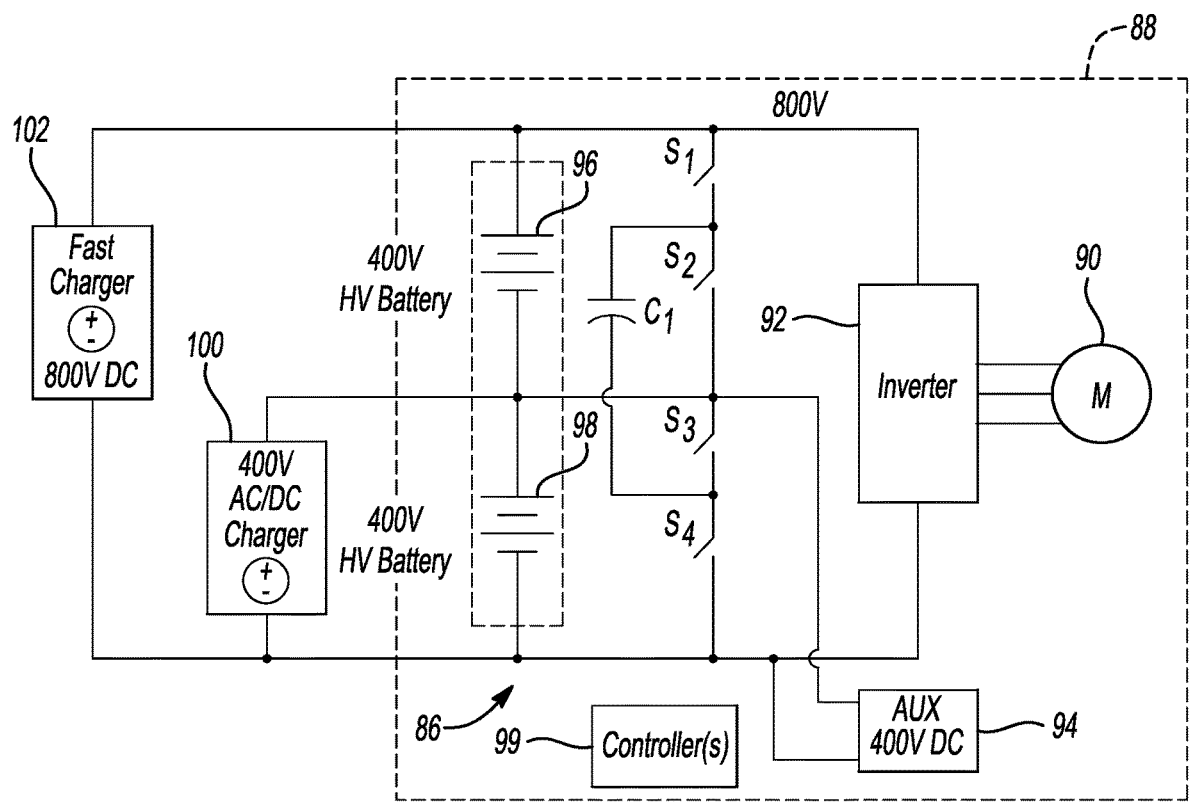
FIG. 7 is a block diagram of portions of another example automotive vehicle and charger equipment.

Referring to FIG. 7, a power system 86 for a vehicle 88 includes an electric machine 90, an inverter 92, 400V auxiliary circuits 94, such as an OBC, OBG, APM and other electronic loads, four switches S1, S2, S3, S4, a capacitor C1, a pair of 400V batteries, 96, 98, and a controller 99. The electric machine 90 is electrically connected with the inverter 92. The switches S1, S2, S3, S4 are electrically in series, and are electrically in parallel with the inverter 92. The switches S3, S4 are also electrically in parallel with the 400V auxiliary circuits 94. The capacitor C1 is electrically in parallel with the switches S2, S3, which are adjacent to one another. The 400V batteries 96, 98 are electrically in series. The 400V battery 96 is also electrically in parallel with the switches S1, S2, and the 400V battery 98 is electrically in parallel with the switches S3, S4 and 400V auxiliary circuits 94. The controller 99 is in communicative control with the components of the vehicle 88 and, among other things, can command selective activation of the switches S1, S2, S3, S4 as discussed above.

The 400V battery 96 can thus be electrically connected across a 400V AC/DC charger 100 to directly charge the 400V battery 98 and indirectly charge the 400V battery 96. The 400V batteries 96, 98 can thus be electrically connected across an 800V DC fast charger 102 to directly charge both of the 400V batteries 96, 98.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. A power system similar to the power system 86, for example, may be implemented using the S1, S2, L1 arrangement similar to that shown in FIG. 3. Thus, other topologies and arrangements are also contemplated generally speaking.

The words used in the specification are words of description rather than limitation, and it is understood that various changes may be made without departing from the spirit and scope of these disclosed materials. The words controller and controllers, and variations thereof for example, may be interchanged.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a pair of electric machines;
   a pair of inverters electrically in series, each of the inverters configured to provide power to one of the electric machines;
   a pair of traction batteries electrically in series, each of the traction batteries electrically in parallel with one of the inverters; and
   a plurality of switches electrically in series, and collectively electrically in parallel with the traction batteries and inverters such that the switches are connected between the traction batteries and inverters.

2. The vehicle of claim 1 further comprising one or more controllers programmed to operate the switches during charge of one of the traction batteries to balance states of charge of the traction batteries.

3. The vehicle of claim 1 further comprising one or more controllers programmed to operate the switches during operation of one or both of the electric machines to balance a state of charge of the traction batteries.

4. The vehicle of claim 1 further comprising a capacitor electrically in parallel with a collective pair of the switches.

5. The vehicle of claim 4, wherein a number of the switches is four.

6. The vehicle of claim 1 further comprising an inductor having a terminal electrically connected between an adjacent pair of the switches and a terminal electrically connected between the traction batteries.

7. The vehicle of claim 6, wherein a number of the switches is two.

8. The vehicle of claim 1, wherein one of the traction batteries is configured to receive charge from a charger.

9. The vehicle of claim 1, wherein the traction batteries are configured to receive charge from a charger.

10. A power system comprising:
    an inverter;
    a pair of traction batteries electrically in series, and collectively in parallel with the inverter;
    a plurality of switches electrically in series, and collectively electrically in parallel with the traction batteries and inverter such that the switches are connected between the traction batteries and inverter; and
    one or more controllers programmed to operate the switches during charge of one of the traction batteries or operation of the inverter to balance states of charge of the traction batteries.

11. The power system of claim 10 further comprising a capacitor electrically in parallel with a collective pair of the switches.

12. The power system of claim 11, wherein a number of the switches is four.

13. The power system of claim 10, wherein one of the traction batteries is configured to receive charge from a charger.

14. The power system of claim 10, wherein the traction batteries are configured to receive charge from a charger.

15. A power system comprising:
a pair of inverters electrically in series;
a pair of traction batteries electrically in series, each of the traction batteries electrically in parallel with one of the inverters;
a plurality of switches electrically in series, and collectively electrically in parallel with the traction batteries and inverters such that the switches are connected between the traction batteries and inverters; and
one or more controllers programmed to operate the switches during charge of one of the traction batteries or operation of the inverters to balance states of charge of the traction batteries.

16. The power system of claim 15 further comprising a capacitor electrically in parallel with a collective pair of the switches.

17. The power system of claim 16, wherein a number of the switches is four.

18. The power system of claim 15 further comprising an inductor having a terminal electrically connected between an adjacent pair of the switches and a terminal electrically connected between the traction batteries.

19. The power system of claim 18, wherein a number of the switches is two.

20. The power system of claim 15, wherein the traction batteries are 400V traction batteries.

\* \* \* \* \*